United States Patent [19]
Goulet

[11] Patent Number: 6,106,215
[45] Date of Patent: Aug. 22, 2000

[54] APPARATUS FOR LOADING AND STORING VEHICLES

[76] Inventor: Daniel Claude Goulet, 3915 Notre Dame, Hanmer, Canada, P3P 1X2

[21] Appl. No.: 09/390,216

[22] Filed: Sep. 8, 1999

[51] Int. Cl.[7] ....................................................... B60P 1/43
[52] U.S. Cl. ............................................ 414/538; 414/500
[58] Field of Search ................................... 414/538, 506, 414/500, 522, 462, 494

[56] References Cited

U.S. PATENT DOCUMENTS

| | | | |
|---|---|---|---|
| 1,597,592 | 8/1926 | Galloway | 414/538 X |
| 2,188,374 | 1/1940 | Sanchez | 414/538 |
| 2,387,082 | 10/1945 | Malling | 414/500 |
| 3,734,321 | 5/1973 | Long et al. | 214/450 |
| 3,752,343 | 8/1973 | Krautkremer | 214/505 |
| 3,843,002 | 10/1974 | Pihlgren | 214/450 |
| 4,505,619 | 3/1985 | Sargent | 405/220 |
| 5,556,249 | 9/1996 | Heine | 414/500 |
| 5,730,577 | 3/1998 | Jones | 414/522 X |
| 5,810,546 | 9/1998 | Schmoling | 414/538 |

FOREIGN PATENT DOCUMENTS 895801  5/1962  United Kingdom ................... 414/538

*Primary Examiner*—Steven A. Bratlie
*Attorney, Agent, or Firm*—Dimock Stratton Clarizia; Mark B. Eisen

[57] ABSTRACT

An apparatus for loading a vehicle onto an automobile has a ramp pivotally secured to the automobile. A trolley is drawn along the ramp by a front cable attached to a winch. At least one rear cable is secured between the trolley and the ramp, so that when the winch is activated to draw the trolley forward the ramp is elevated and the automobile can be maneuvered into a desired position.

18 Claims, 4 Drawing Sheets

APPARATUS FOR LOADING AND STORING VEHICLES

FIELD OF THE INVENTION

This invention relates to an apparatus used to load vehicles and equipment for transportation and to store vehicles and other equipment. In particular, this invention relates to an apparatus which facilitates the loading and unloading of the vehicles and other equipment onto a truck and the storage of such vehicles and equipment.

BACKGROUND OF THE INVENTION

The increasing popularity of personal recreational vehicles such as personal watercraft, snowmobiles, all terrain vehicles and other similar vehicles have presented unique problems for the transportation and storage of these vehicles. Often these vehicles are stored in a location remote from the area where the vehicle will be used and the vehicle must be transported over relatively long distances. Many jurisdictions prohibit the operation of these types of vehicles on public highways, so typically an automobile is used to transport the vehicle to the intended destination.

A common method of transporting these vehicles is to load the vehicle onto a trailer and attach the trailer to the rear of a car or a truck. Trailer type transportation devices suffer from the drawback that a separate and often expensive trailer and trailer hitch must be purchased and installed on the truck. Moreover devices of this type are cumbersome and difficult for one person to maneuver manually, and generally require more than one person to load and unload the vehicle onto the trailer.

A method of transporting these vehicles involves loading the vehicle onto the bed of a pick-up truck or similar truck. An example is disclosed in U.S. Pat. No. 5,810,546 to Schmoling, which is incorporated herein by reference. This patent discloses an apparatus for loading a personal watercraft onto a bed of a pick-up truck using a telescopic rail and pulley system. The vehicle is loaded and unloaded on the rail system. A winch and pulley assembly is utilized to allow a single individual to load or unload the vehicle onto the truck.

When this type of system is used for watercraft, the rails rest in shallow water and the pulley system is used to lower the watercraft into the water. Once the rail system is engaged, it is difficult to maneuver or move the truck forwards or backwards so as to load or unload the vehicle at the proper depth of water at the shoreline. While the truck can be moved forward by dragging the rails, this is generally not desirable as the rails and/or the surrounding terrain can be damaged by this action. Moreover, it is difficult to move the truck in a reverse or backwards direction as the rails are generally positioned at a downward angle from the rear of the truck to rest on the shore of the body of water. The rails resist any movement backwards and tend to dig into the ground if the truck is moved backwards, so that any backwards movement of the truck would risk damaging the rails. Thus, the vehicle must either be in a fully loaded or fully unloaded position and the rails removed before the truck can be moved forward or backward.

U.S. Pat. No. 3,734,321 to Long et al., which is incorporated herein by reference, discloses a similar type of ramp and winch system which suffers from the same disadvantages as described in connection with U.S. Pat. No. 5,810,546 to Schmoling. In addition, this system may be unstable when the vehicle is loaded onto the truck as a result of an unusually high center of gravity.

It would accordingly be advantageous to provide a transportation and storage apparatus which allows for the loading and unloading of vehicles from a carrier where the carrier can be moved forwards or backwards without having to completely load or unload the vehicle. In particular, it would be advantageous to provide a vehicle transportation and storage apparatus which allows the carrier to be moved forwards or backwards without having to first remove or store the ramp.

SUMMARY OF THE INVENTION

The present invention thus provides an apparatus for loading a vehicle, comprising a ramp adapted to be pivotally secured to an automobile having a storage portion; a trolley for carrying a vehicle, the trolley having wheels adapted to roll on the ramp; at least one front cable having a first end for securing to a cable pulling device and a second end for securing to the trolley, such that the cable pulling device can draw the trolley along the ramp; and at least one rear cable having a first end for securing to the trolley and a second end for securing to the ramp; whereby when the cable pulling device is activated to draw the trolley, the ramp is elevated by the transfer of the pulling force of the cable pulling device from the first cable, the trolley and the second cable to the ramp.

The present invention further provides a trolley for transporting and storing a vehicle for use with an automobile, comprising four wheels, a bed for supporting the vehicle, and a front pull arm, whereby the trolley and a vehicle secured to the trolley can be loaded and unloaded onto a storage portion of an automobile and can be moved to be stored when unloaded from the storage portion.

The present invention further provides a method of unloading a vehicle from an automobile, the vehicle being secured on a trolley, comprising the steps of: securing the trolley to a front cable secured to a cable pulling device; pivotally securing a ramp adjacent to a rear end of a storage portion of a vehicle; positioning the trolley near a rear of the storage portion; securing a first end of at least one rear cable to the trolley and a second end of the rear cable to the ramp; drawing the trolley forward in the storage portion to tension the rear cable and elevate the ramp; and dispensing the front cable from the cable pulling device to lower the ramp and move the trolley down the ramp.

BRIEF DESCRIPTION OF THE DRAWINGS

In drawings which illustrate by way of example only preferred embodiments of the invention.

DETAILED DESCRIPTION OF THE INVENTION

Figure 1:
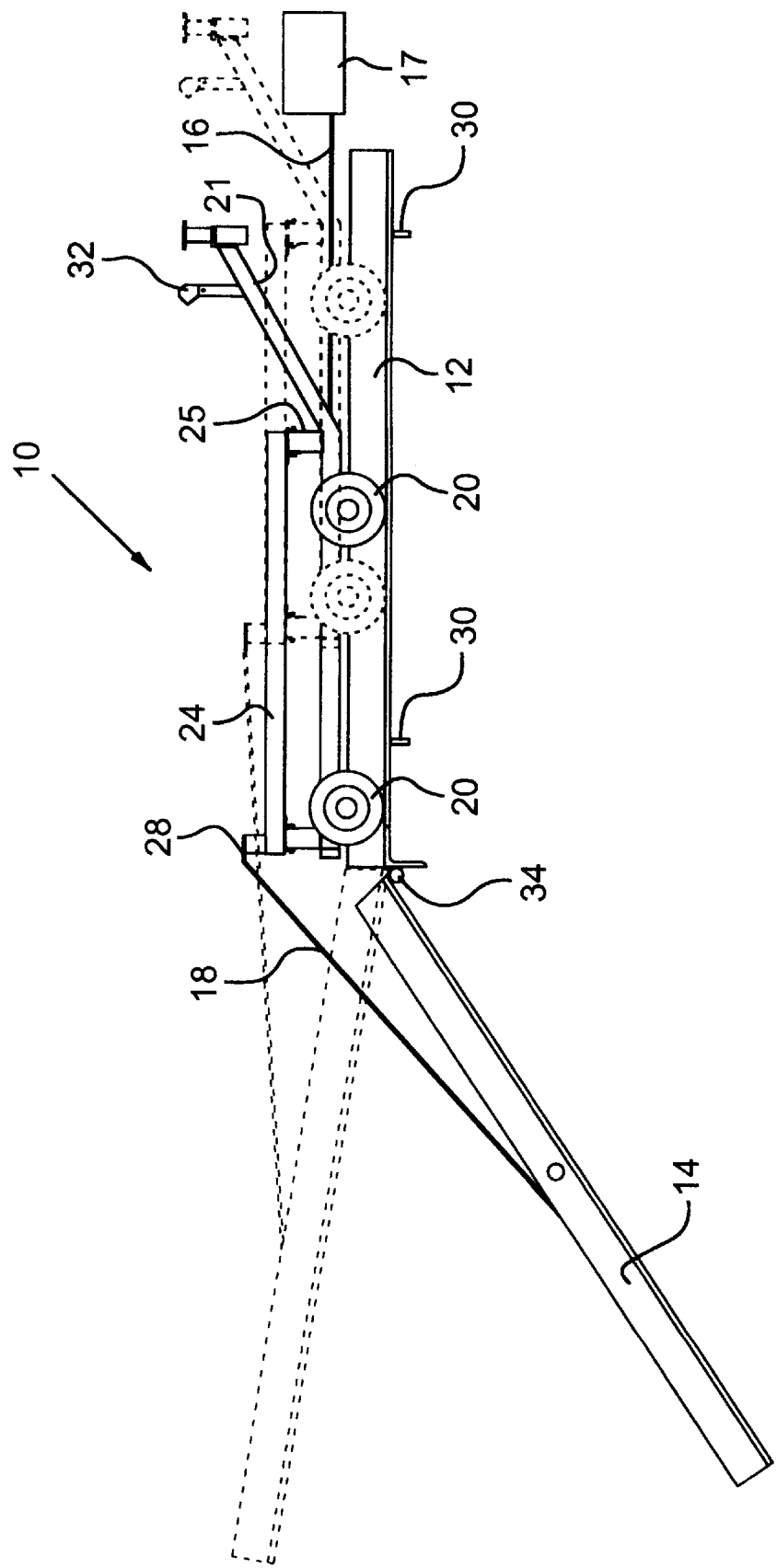
FIG. 1 is a side elevation view of an apparatus according to the present invention.

FIG. 1 illustrates a preferred embodiment of the vehicle transportation and storage apparatus of the invention. While the following description of the invention uses the example of transporting a personal watercraft, the invention is equally applicable to the transportation and storage of other vehicles such as snowmobiles, all-terrain vehicles, boats, golf-carts, go-carts etc. and equipment including lawnmowers, snowblowers etc. Moreover, the apparatus of the invention is not limited to transporting any particular type of vehicles or equipment, although it is most advantageously used in the loading of watercraft into a body of water.

Figure 3:
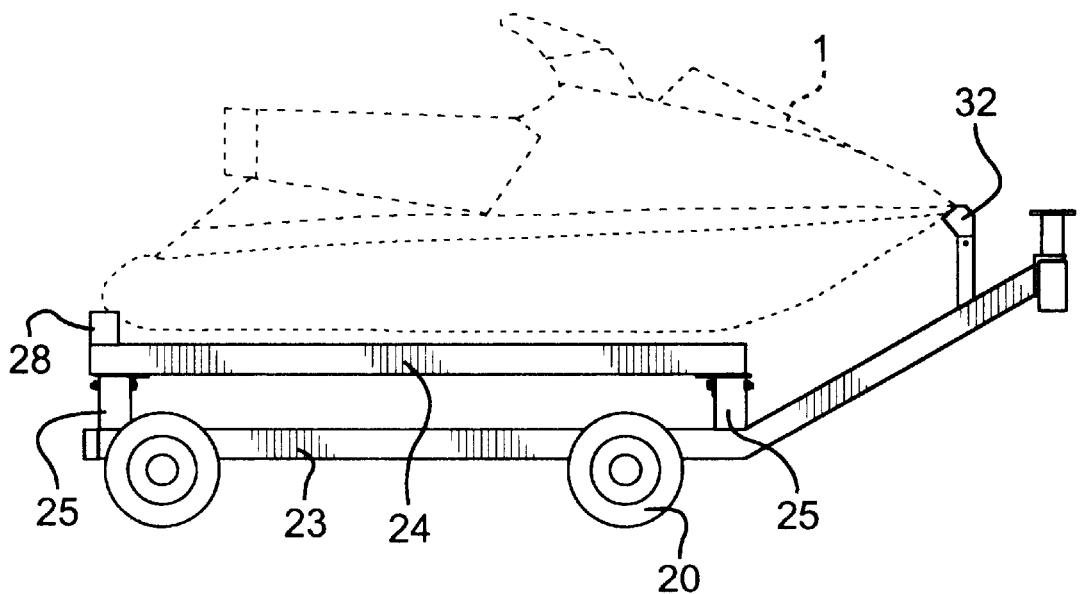
FIG. 3 is a side elevation view of the trolley of FIG. 2.

In the preferred embodiment, the vehicle 1 to be transported or stored is secured to a trolley 10, as illustrated in FIG. 3. The trolley 10 preferably has four wheels 20 and a pull arm 21 which provides stability and maneuverability of the trolley 10. The pull arm 21 may be formed integrally with a frame 23 bearing wheels 20 and supporting a trolley bed 24 upon which the vehicle rests via supports 25.

While the preferred embodiment of this invention is installed on a pick-up truck 2 having a flat bed 4 and a rear tailgate 6 (shown in phantom in FIG. 5), it will be appreciated that this apparatus can be used with other types of transportation carriers such as any type of truck or van capable of supporting the apparatus.

Figure 5:
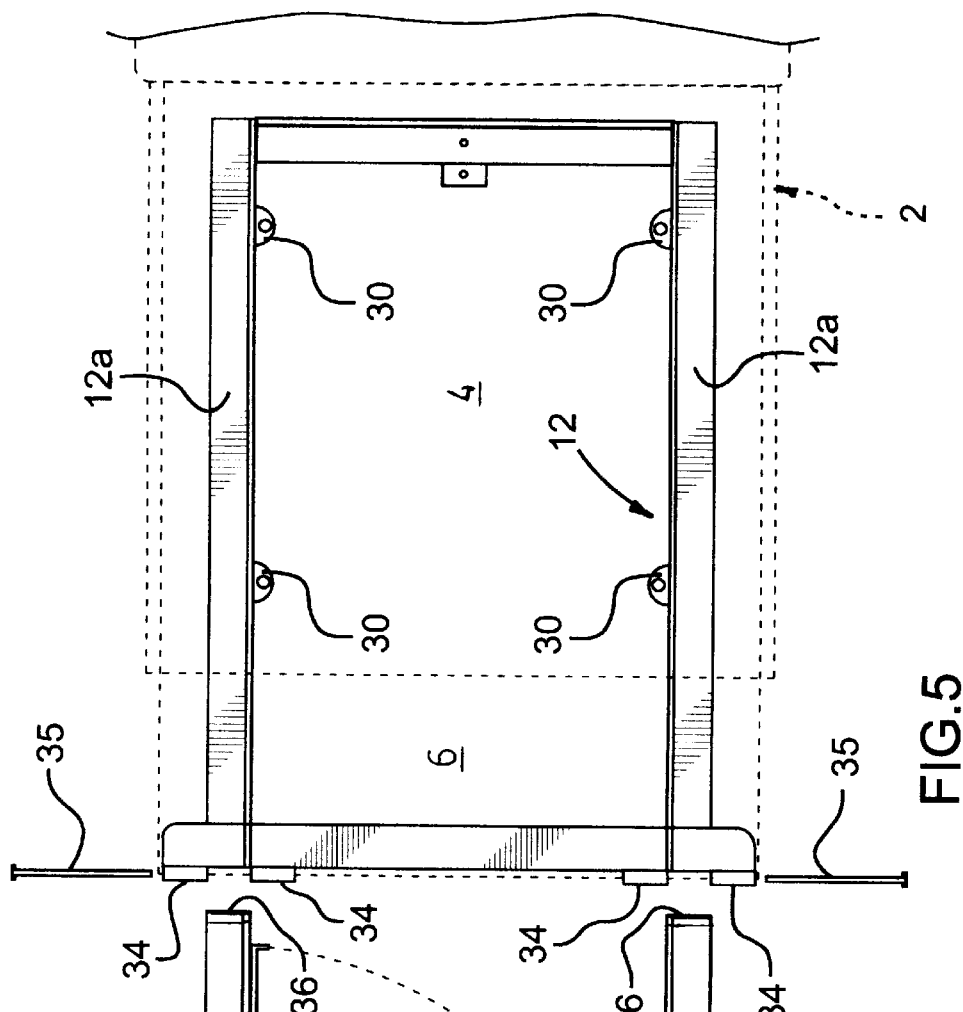
FIG. 5 is a partially exploded top plan view of the frame and ramp in the apparatus of FIG. 1.
Figure 6:
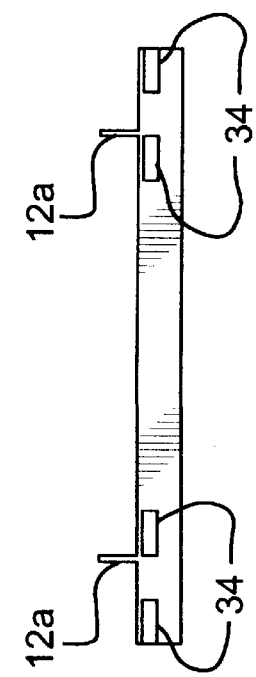
FIG. 6 is rear elevation view of the frame of FIG. 5.

Preferably the apparatus is provided with a frame 12 installed on the bed 4 of a pick-up truck 2, as shown in FIG. 5. Frame 12 may be removably secured to the bed 4 of the pickup truck 2 by pins 30 disposed into standard apertures located in the bed of most commercially available pickup trucks 2. The weight of the frame 12 will retain the frame 12 in position in the truck bed 4. Since permanent installation of the frame 12 onto the truck bed 4 is not required, the frame 12 can easily be removed from the truck bed 4 when desired. Alternatively, if desired, the frame 12 can be permanently secured to the truck bed 4 by bolting or welding the frame 12 to the bed 4 or otherwise affixing the frame 12 to the bed 4 in any suitable fashion.

The frame 12 is preferably of a length equal to or less than length than the bed 4 of the truck 2 (with the tailgate removed) or the bed 4 plus the tailgate 6, as shown in FIG. 5. The frame 12 comprises two tracks 12a which are connected by retainer bars 12b so as to be spaced apart by approximately the same distance as the distance between the wheels 20 of the trolley 10. The tracks 12a of the frame 12 are preferably L-shaped in cross-section, to restrain the wheels 20 against lateral displacement as the trolley 10 is being loaded onto and unloaded from the frame 12.

Figure 4:
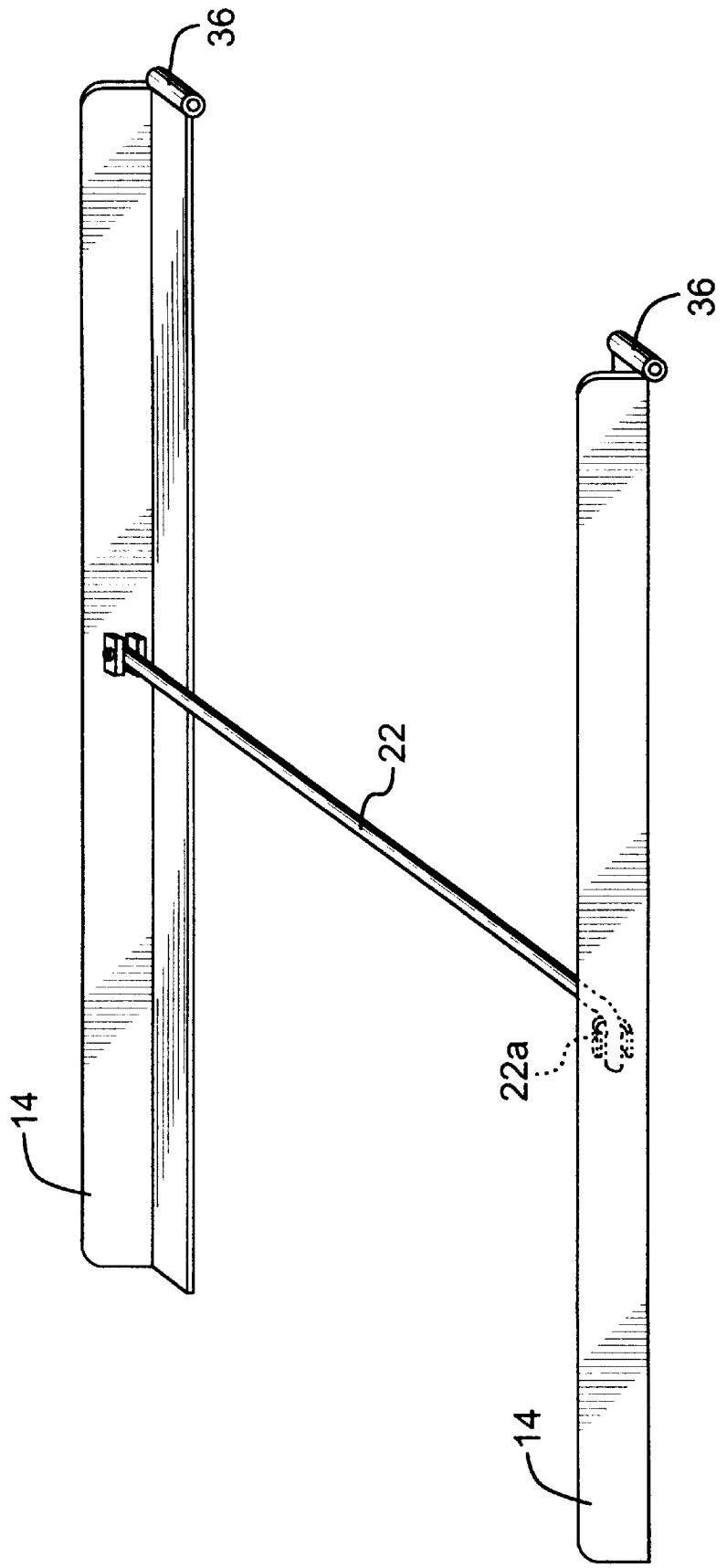
FIG. 4 is a side elevation view of the rail in the apparatus of FIG. 1.

The apparatus further provides a ramp, in the preferred embodiment comprising rails 14 for the loading and unloading of the trolley 10 carrying the vehicle 1. In the preferred embodiment, rails 14, as illustrated in FIGS. 4 and 5, are removably attached to the rear of the frame 12 by way of a hinge connection between hinge knuckles 34, 36 and pins 35, as best illustrated in FIG. 5. As illustrated in FIG. 4, spacer bar 22 maintains the desired spacing between the two rails 14, which is preferably approximately the same as the distance between the wheels of the trolley 10. The spacer bar 22 may be pivotally connected to one rail 14 as shown in FIG. 5, so that it can swing from a position locked in eye 22a into a position parallel with the rail 14 to facilitate storage when the rails 14 are not in use.

As shown in FIG. 1, the trolley 10 is secured by front cable 16 to a cable pulling device, preferably a motorized winch 17, which provides the required force to load, unload and secure the vehicle 1 in the truck 2. In the preferred embodiment two rear cables 18 are removably attached to the trolley 10 with one of the cables 18 attached to each rail 14, preferably about an approximate midpoint of the rail 14. The rails 14 can thus be elevated by the pulling action of the winch 17 on the front cable 16, which force is transferred to the trolley 10 to draw the trolley 10 forward in the truck bed 4, and this in turn draws the rear cables 18 to raise the rails 14, as shown in phantom in FIG. 1.

The rails 14 are preferably L-shaped in cross-section with the same orientation as the frame 12. Together, the rails 14 and the frame 12 form a guide for trolley wheels 20. The L-shaped cross section of the frame 12 and rails 14 thus restrict the lateral movement of the trolley 10 and guide the trolley 10 during loading and unloading from the truck 2.

Figure 2:
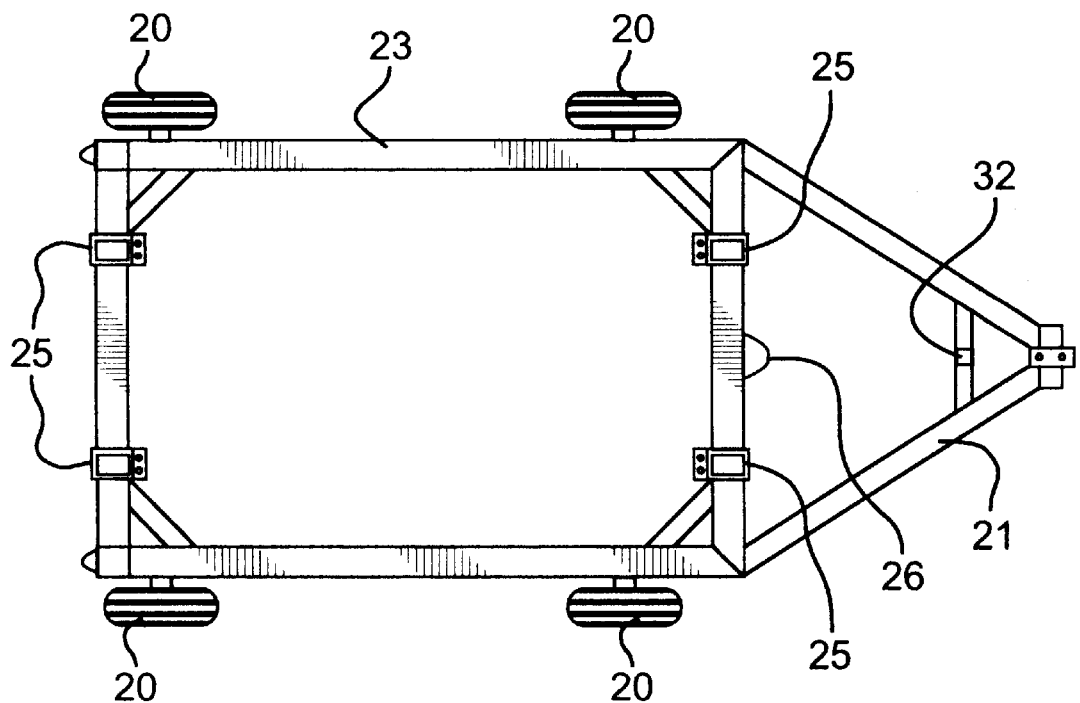
FIG. 2 is a top plan view of the trolley in the apparatus of FIG. 1.

As illustrated in FIG. 3, nose stopper 32 can be provided on the trolley 10 to secure vehicles such as personal watercraft. In the preferred embodiment the front cable 16 is removably attached to the trolley 26 (illustrated in FIG. 2) preferably by way of a hook and eye attachment 26. Similarly, the rear 28 of the trolley is removably attached to the cables 18 which actuate the rails 14. As such, the trolley 10 can be removed from the apparatus and used to store the vehicle 1.

The trolley 10 and frame 12 preferably have a height no greater than approximately fifteen inches. The low profile of the apparatus allows the center of gravity of the trolley 10, vehicle 1 and truck 2 combination to remain substantially the same as the center of gravity of the truck itself, thereby allowing for the safe transportation of the vehicle 1.

In operation, the rails 14 are attached to the frame 12 by aligning the knuckles 36 at the front ends of the rails 14 with the knuckles 34 at the rear of the frame 12 and inserting the hinge pins 35. With the vehicle 1 removably secured to the trolley 10, the trolley 10 is aligned with the rails 14. The front cable 16 is attached between the trolley 10 and the winch 17. The winch 17 is activated to draw the front cable 16 onto the drum of the winch 17. This draws the trolley 10 forward and up the rails 14 to the frame 12. The rails 14 are detached and stored (for example, in the truck bed 4). The trolley 10 and vehicle 1 can then be transported safely as the trolley 10 and vehicle 1 sit in the bed 4 of the truck 2, secured therein by the front cable 16.

To unload a vehicle, the rails 14 are reattached to the frame 12. The front cable 16 is loosened by unwinding the winch so that the trolley 10 and vehicle combination can be manually rolled toward the rear of the truck until the rear wheels 20 of the trolley 10 are near on the rails 14. Once the rear wheels 20 are on the rails 14, the influence of gravity will pull the trolley 10 and vehicle 1 down the ramp and the winch 17 acts to control the rate of descent, to safely allow the trolley 10 and vehicle combination to be unloaded from the truck.

If it is desired to move the truck forward or backward to a different position, the rear cables 18 are attached between the rails 14 and the rear 28 of the trolley 10 and the winch 17 is activated to draw the front cable 16 and pull the trolley 10 forward. As the trolley 10 moves forward in the truck bed 2, the rear cables 18 become taut. The winch 17 continues to draw the trolley 10 forward in the truck bed 2, increasing the tension on the rear cables 18 and ultimately raising the rails 14, as shown in phantom in FIG. 1. Once the rails 14 are elevated, the truck can then be moved forward or backward without damaging the rails 14 or the surrounding terrain.

This obviates the need to remove the rails 14 before maneuvering the truck 2 and once the truck 2 is in position, unloading of the vehicle 1 can then be resumed by reversing the winch 17. Under the controlled dispensing of the cable 16 from the winch 17, the weight of the rails 14 draws the trolley 10 back to the rear of the truck bed and onto the rails 14. The influence of gravity draws the trolley 10 down the rails 14 until the trolley 10 is clear of the rails 14.

The apparatus of the invention is thus particularly suitable for unloading watercraft into a body of water, since the rear end of the truck 2 (with rails 14 elevated) can be positioned immediately beside the water's edge, and when the winch 17 is reversed the rails 14 are lowered directly into the water. The buoyancy of the watercraft allows a single person to release the vehicle 1 from the trolley and restart the winch 17 to draw the trolley 10 back into the truck bed 2.

For storage, once unloaded from the truck, the trolley 10 and vehicle 1 can be unhooked from the cables 16 and 18 and easily maneuvered by one person into a storage facility. Vehicles such as personal watercraft which do not have wheels can thus be stored on the trolley 10 itself. The trolley 10 can also be advantageously used to move and store other vehicles which have wheels, but which cannot be moved without first starting their engines, such as snowmobiles. If the trolley 10 is used, the snowmobile's engine need not be started to maneuver and store the snowmobile. The trolley 10 is thus preferably provided with four wheels 20 so as to be self standing; the stability and maneuverability provided for by the four trolley wheels 20 allows for easy maneuvering for storage of the vehicle by one individual.

Preferred embodiments of the invention having been described herein by way of example, other modifications and adaptations will be apparent to those skilled in the art. For example, without limiting the foregoing, it will be appreciated that the configuration of the frame 12 and rails 14 may vary, or the frame 12 can be omitted entirely and the trolley 10 can rest directly on the truck bed 4. The invention includes all such modifications or variations as fall within the scope of the appended claims.

I claim:

1. An apparatus for loading a vehicle, comprising:
    a ramp adapted to be pivotally secured to an automobile having a storage portion;
    a trolley for carrying a vehicle, the trolley having wheels adapted to roll on the ramp;
    at least one front cable having a first end for securing to a cable pulling device and a second end for securing to the trolley, such that the cable pulling device can draw the trolley along the ramp; and
    at least one rear cable having a first end for securing to the trolley and a second end for securing to the ramp;
    whereby when the cable pulling device is activated to draw the trolley, the ramp is elevated by the transfer of the pulling force of the cable pulling device from the first cable, the trolley and the second cable to the ramp.

2. The apparatus of claim 1 wherein the apparatus additionally comprises a frame for mounting in a storage portion of a vehicle wherein the frame and the ramp provide guiding means for the trolley.

3. The apparatus of claim 1 wherein the ramp comprises two rails pivotally secured near the rear of the carrier.

4. The apparatus of claim 3 comprising two rear cables each having a first end secured to the trolley and a second end secured to one of the rails.

5. The apparatus of claim 2 wherein the ramp is pivotally secured to a rear end of the frame.

6. The apparatus of claim 5 wherein the rear cable is secured to the rear of the trolley.

7. The apparatus of claim 1 wherein the trolley has four wheels.

8. The apparatus of claim 1 wherein the cable pulling device comprises a winch.

9. The apparatus of claim 2 wherein a length of the frame is approximately equal to or less than a length of the storage portion of a vehicle.

10. The apparatus of claim 2 wherein the frame comprises L-shaped frame members.

11. The apparatus of claim 3 wherein the rails comprise L-shaped members.

12. A trolley for transporting and storing a vehicle for use with an automobile, comprising four wheels, a bed for supporting the vehicle, and a member for attaching a front cable and a member for attaching at least one rear cable, whereby the trolley and a vehicle secured to the trolley can be loaded and unloaded onto a storage portion of an automobile and the trolley and vehicle can be moved to a storage location when unloaded from the storage portion of the vehicle.

13. The trolley of claim 12 wherein the bed is supported on a frame bearing the wheels.

14. A method of unloading a vehicle from an automobile, the vehicle being secured on a trolley, comprising the steps of:
    securing the trolley to a front cable secured to a cable pulling device;
    pivotally securing a ramp to a rear end of a storage portion of a vehicle;
    positioning the trolley near a rear of the storage portion;
    securing a first end of at least one rear cable to the trolley and a second end of the rear
    cable to the ramp;
    drawing the trolley forward in the storage portion to tension the rear cable and elevate the ramp; and
    dispensing the front cable from the cable pulling device to lower the ramp and move the trolley down the ramp.

15. The method of claim 14 including the step of guiding the trolley down the ramp.

16. The method of claim 15 wherein the trolley is guided by L-shaped frame members.

17. The method of claim 15 wherein the trolley is guided by L-shaped rails.

18. The method of claim 14 wherein the ramp comprises two rails.

* * * * *